US008266073B2

(12) United States Patent
Duncan et al.

(10) Patent No.: US 8,266,073 B2
(45) Date of Patent: Sep. 11, 2012

(54) SYSTEM FOR MAXIMIZING A VALUE OF LUMBER

(75) Inventors: Timothy Duncan, Grants Pass, OR (US); Edward D. Wagner, Rogue River, OR (US); Michael R. Milota, Corvallis, OR (US)

(73) Assignee: Wagner Electronic Products, Inc., Rogue River, OR (US)

( * ) Notice: Subject to any disclaimer, the term of this patent is extended or adjusted under 35 U.S.C. 154(b) by 320 days.

(21) Appl. No.: 12/572,096

(22) Filed: Oct. 1, 2009

(65) Prior Publication Data

US 2010/0087950 A1 Apr. 8, 2010

Related U.S. Application Data

(60) Provisional application No. 61/102,247, filed on Oct. 2, 2008.

(51) Int. Cl.
*G06F 17/00* (2006.01)

(52) U.S. Cl. .......................................................... 705/400

(58) Field of Classification Search .................. 705/400, 705/26.1–27.2, 1.1

See application file for complete search history.

(56) References Cited

U.S. PATENT DOCUMENTS

| | | | | |
|---|---|---|---|---|
| 4,683,418 | A | 7/1987 | Wagner et al. | |
| 5,361,513 | A * | 11/1994 | Woessner | 34/363 |
| 5,394,097 | A * | 2/1995 | Bechtel et al. | 324/687 |
| 5,621,391 | A | 4/1997 | Elseth | |
| 5,654,643 | A * | 8/1997 | Bechtel et al. | 324/687 |
| 5,916,826 | A * | 6/1999 | White | 44/551 |
| 7,676,953 | B2 * | 3/2010 | Magill | 34/282 |
| 7,680,304 | B2 * | 3/2010 | Biernacki et al. | 382/108 |
| 2002/0148716 | A1 * | 10/2002 | Murcia | 202/83 |
| 2006/0201022 | A1 | 9/2006 | Logan | |

* cited by examiner

*Primary Examiner* — Igor Borissov
(74) *Attorney, Agent, or Firm* — Klarquist Sparkman, LLP

(57) ABSTRACT

A system and method is disclosed that uses moisture content readings in order to determine how to maximize the price value of lumber. Feedback can then be provided to a kiln controller on how to adjust kiln settings in order to increase the value of the lumber produced. In one embodiment, moisture content is determined on a plurality of boards. Using the moisture content readings, an actual value of the plurality of boards is determined. Then a calculation is made to determine how to modify moisture content in order to maximize the value of the lumber. In yet another embodiment, geographic positions of individual packages are tracked in the kiln. The efficiency of the kiln is determined based on drying uniformity of the packages. Then the moisture content can be modified to determine how it impacts value of a charge of lumber.

20 Claims, 10 Drawing Sheets

SYSTEM FOR MAXIMIZING A VALUE OF LUMBER

CROSS REFERENCE TO RELATED APPLICATION

This application claims priority from U.S. Provisional Application No. 61/102,247, filed Oct. 2, 2008, which is hereby incorporated by reference.

FIELD

The present invention relates generally to moisture content in lumber, and more particularly to maximizing the price value of lumber using measured moisture content.

BACKGROUND

Wood mills in North America and other parts of the world perform processing of timber to produce, among other products, dimensioned lumber for use in construction. The basic process flow begins with the saw mill, where a log is sawed into rough dimensioned lumber. The lumber is then cut to specific lengths and sorted into separate bins depending upon the species and rough dimensions. The sorted lumber is then bundled into packages and moved to a staging area to be readied for the kiln-drying process.

The kiln-drying process starts with stacking multiple packages atop one another in rows and columns called stacks. The combined stacks encompass a "charge" of lumber. Each charge of lumber is dried inside a kiln over a period of time until the charge is considered to be at the appropriate level of average moisture content. At that time, the kiln is turned off and the charge of lumber is removed. The packages are moved to a staging area where they are planed down to a final dimension and graded to determine value. Value depends on the general shape of the lumber and the moisture content.

Ideally, every board will be at the ideal moisture content, but such optimization is not practical due to the large volume of boards and imperfections in the drying process. Thus, the mills strike a balance between over-drying and under-drying, as either can cause lumber to lose value. For example, over-drying increases the amount of crook, warping and checking, which all degrade the value of lumber. On the other hand, under-drying can produce mold, also devaluing the lumber. Current standards allow a small percentage, about 5%, of their lumber to be above a critical threshold value of moisture content (usually around 19%).

Currently, if a mill has under-dried lumber, they have several options. First they can measure moisture content of each board and drop out the wet ones for re-drying. Second, they can sell the boards as "wet" lumber at a cost discount. Finally, they can allow the wet boards to pass through and be included with the dry lumber. However, selling wet boards increases the risk of the mill receiving a "wet claim". Wet claims are known in the industry to be very costly to a mill.

Currently, mills employ different methods in determining when to shut down a kiln. Most kilns use an in-kiln moisture measurement system. This system is limited as it has only a small number of data points from which to estimate the average moisture content of a charge. Typically, such a system employs 4 to 12 sensor plates distributed throughout the kiln, with each sensor plate providing an average estimate of moisture content for a portion of a stack of lumber. One example of when to shut down the kiln is to average the sensor plate readings and compare the average to a predetermined threshold. When the threshold is surpassed, the kiln is shut down.

Often, the in-kiln system moisture content determinations are not trusted and spot checks are performed with handheld meters in an attempt to confirm the in-kiln meter values. At other locations, in-kiln meters are not present, and operators rely on taking the spot checks with a handheld meter and averaging those values to determine the current average moisture content of the lumber.

There are several techniques for selecting the predetermined threshold for shutting down the kiln. First, customers can dictate the threshold value by requesting a specific average moisture content. Another method is to set the threshold value to a much lower value than is actually required to target a 100% certainty that the lumber will not produce a "wet" claim". Another approach is to set the threshold based on a study performed in the distant past, and for months or years the same average threshold is employed, regardless of whether conditions have changed.

In any event, the prior art lacks a system that adequately maximizes the value of lumber.

SUMMARY

The proposed systems and methods can utilize a business analytical approach to calculate the best technique to dry lumber that maximizes profit potential of each charge of lumber. In particular, the present invention uses moisture content readings to make value determinations in order to calculate how to maximize the value of lumber. Feedback can then be provided to a kiln controller to adjust kiln settings in order to increase the value of the lumber produced.

In one embodiment, moisture content is measured on a plurality of boards. Using the moisture content readings, an actual value of the plurality of boards is determined. Then a calculation is made to determine how to modify moisture content in order to maximize the value of the lumber.

In another embodiment, the actual value is determined by applying a devaluing process based on an amount of under-drying and an amount of over-drying. The calculation to maximize the value of the lumber can be obtained by applying hypothetical or candidate moisture contents to determine the impact on the overall price value. Information can then be provided as feedback to a kiln, such as that the kiln over-dried or under-dried the lumber by a certain percentage, so that adjustments can be made to the kiln process in order to achieve the calculated maximum price value.

In yet another embodiment, geographic positions of individual packages are tracked in the kiln. The efficiency of the kiln is determined based on drying uniformity of the packages. Then the moisture content of individual packages can be modified to determine how it impacts price value of a charge of lumber. Such information can be provided to the kiln owners to report which kilns are underperforming.

The foregoing and other objects, features, and advantages of the invention will become more apparent from the following detailed description, which proceeds with reference to the accompanying figures.

DETAILED DESCRIPTION

Figure 1:
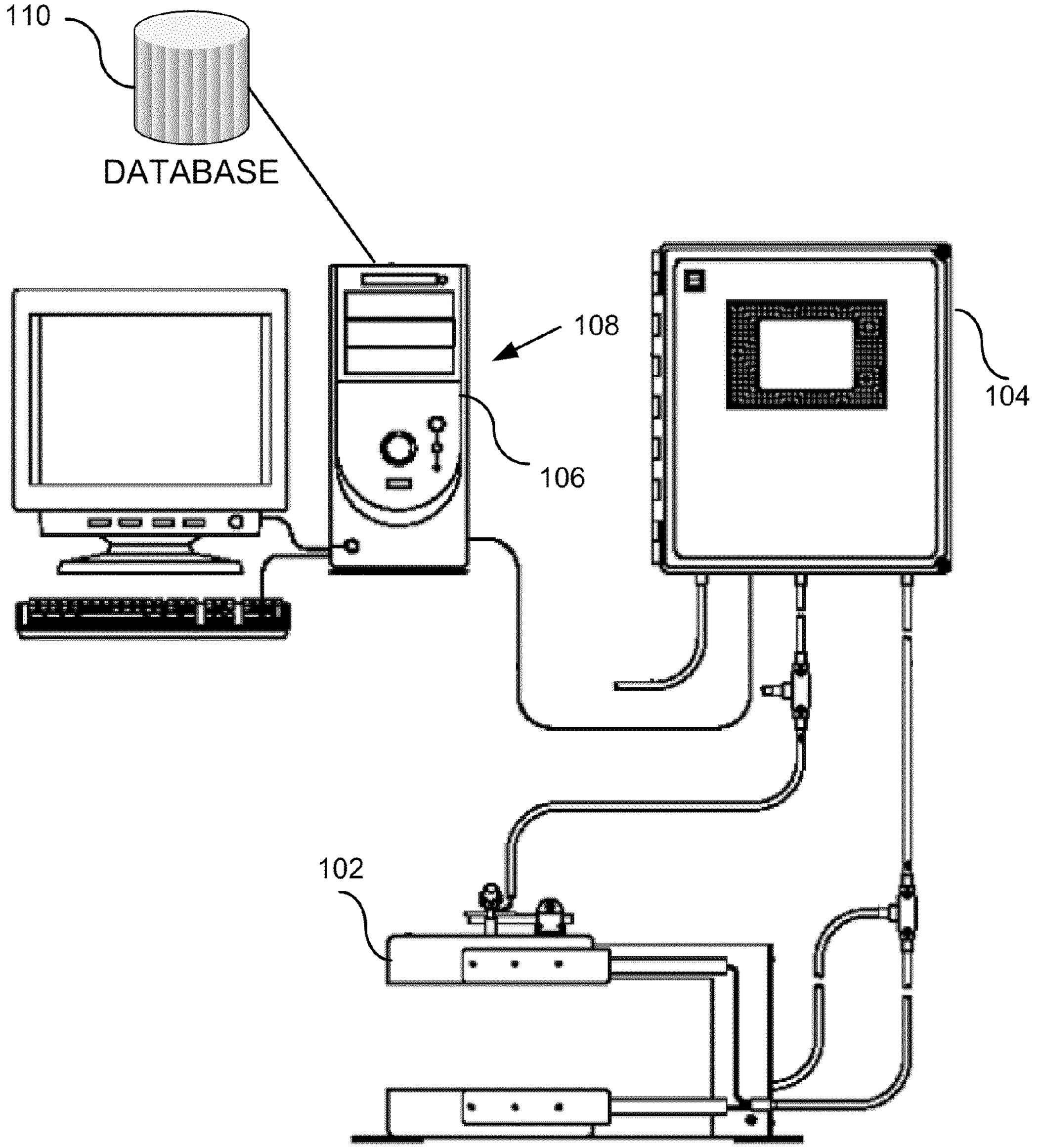
FIG. 1 is a system diagram showing one embodiment for reading moisture content.

Disclosed herein are representative embodiments of methods, systems, and apparatus for computing the maximum price value of lumber. The disclosed methods, systems, and apparatus should not be construed as limiting in any way. Instead, the present disclosure is directed toward all novel and nonobvious features and aspects of the various disclosed embodiments, alone and in various combinations and subcombinations with one another. The methods, systems, and apparatus are not limited to any specific aspect or feature or combinations thereof, nor do the disclosed methods, systems, or apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods or modules can be used in conjunction with other methods or modules.

As more fully explained below, embodiments of the disclosed methods can be performed by software stored on one or more tangible computer-readable media (e.g., one or more optical media discs, volatile memory components (such as DRAM or SRAM), or nonvolatile memory components (such as hard drives)) and executed on a computer. Such software can be executed on a single computer or on a networked computer (e.g., via the Internet, a wide-area network, a local-area network, a client-server network, or other such network). The software embodiments disclosed herein can be described in the general context of computer-executable instructions, such as those included in program modules, which can be executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. For clarity, only certain selected aspects of the software-based implementations are described. Other details that are well known in the art are omitted. For example, it should be understood that the disclosed technology is not limited to any specific computer language, program, or computer.

The systems and methods below can determine an optimum setting for a kiln by analyzing the varying cost of energy and accounting for process deviations and naturally occurring moisture content distributions. A constant feedback control mechanism can be used to track process variations due to differences in lumber and changing seasons to ensure that the maximum price of lumber is constantly achieved.

FIG. 1 shows an exemplary system for measuring moisture content in lumber. Those skilled in the art recognize that there are a number of techniques for measuring moisture content, including radio frequency, resistive (using voltage and/or current measurements), x-ray, etc. Any such techniques can be used with the described system. Nonetheless, FIG. 1 depicts one environment for measuring moisture content. Other environments can easily be substituted. In the illustrated embodiment, a lineal moisture content sensor 102 (such as a moisture meter) is controlled by a moisture content control console 104. By adjusting various settings on the console 104, the sensor 102 can measure the moisture content of various types, sizes, and shapes of wood. When data is received by the console 104, the data is sent to a computer 106, running software 108 (not shown). The data can be saved in a database 110, which is separately coupled to the computer as shown, or which can, alternatively, be stored within the computer itself. As discussed below, the data received by the computer 106 can be analyzed by software 108 to determine the maximum value of lumber. The computer 106 also has a user interface that can be used to receive user input. For example, the user input can be used to segment the data into the separate kiln charges, typically by identifying each package of lumber with either a unique number identifier or a barcode that is associated with a specific charge of lumber.

Figure 2:
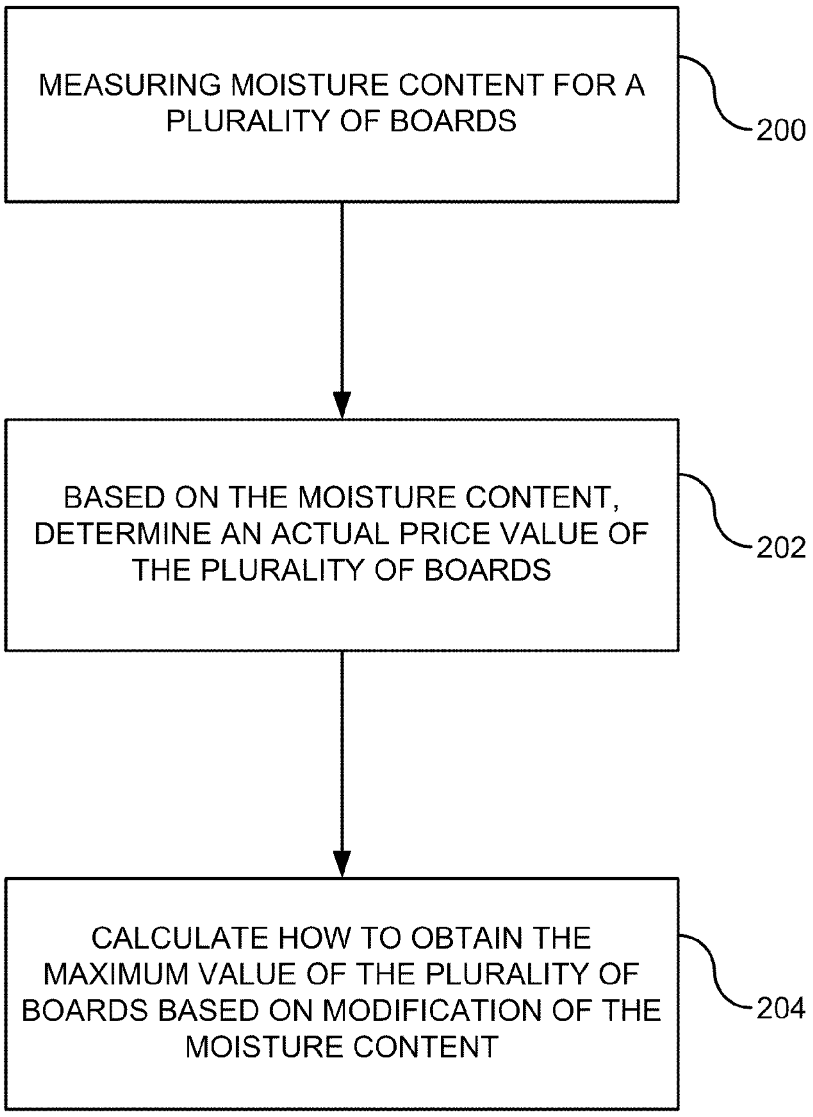
FIG. 2 is a flowchart of a method for calculating the maximum value of lumber.

FIG. 2 shows an embodiment of a method for maximizing the value of lumber. In process block 200, moisture content for a plurality of boards can be measured. In process block 202, based on the moisture content, an actual price value of the plurality of boards is determined. In process block 204, a calculation is made of how to obtain the maximum value of the plurality of boards based on modification of the moisture content. The calculation can be made automatically using the software 108.

Figure 3:
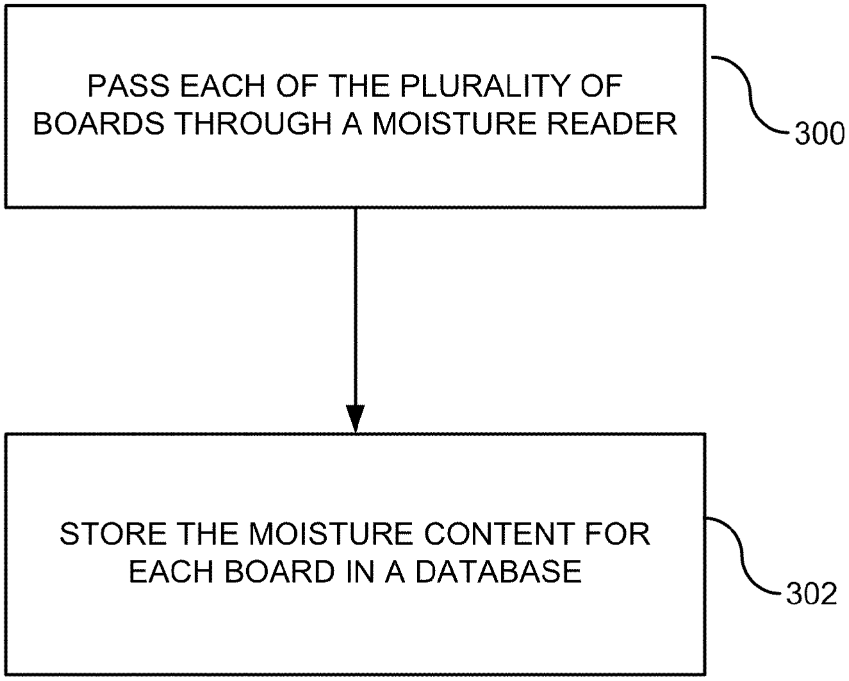
FIG. 3 is a flowchart for determining moisture content for lumber.

FIG. 3 is a flowchart of a method for measuring moisture content in a plurality of boards and represents one embodiment that can be used to implement process block 200 in FIG. 2. In process block 300, each board is passed through a moisture reader. For example, each board can be passed through a moisture reader using the apparatus of FIG. 1. In process block 302, the measured moisture content is stored in the database 110. Additionally, each board can have an identification associated therewith, such as a barcode number or a number associated with a charge of lumber that is stored in the database together with measured moisture content.

Figure 4:
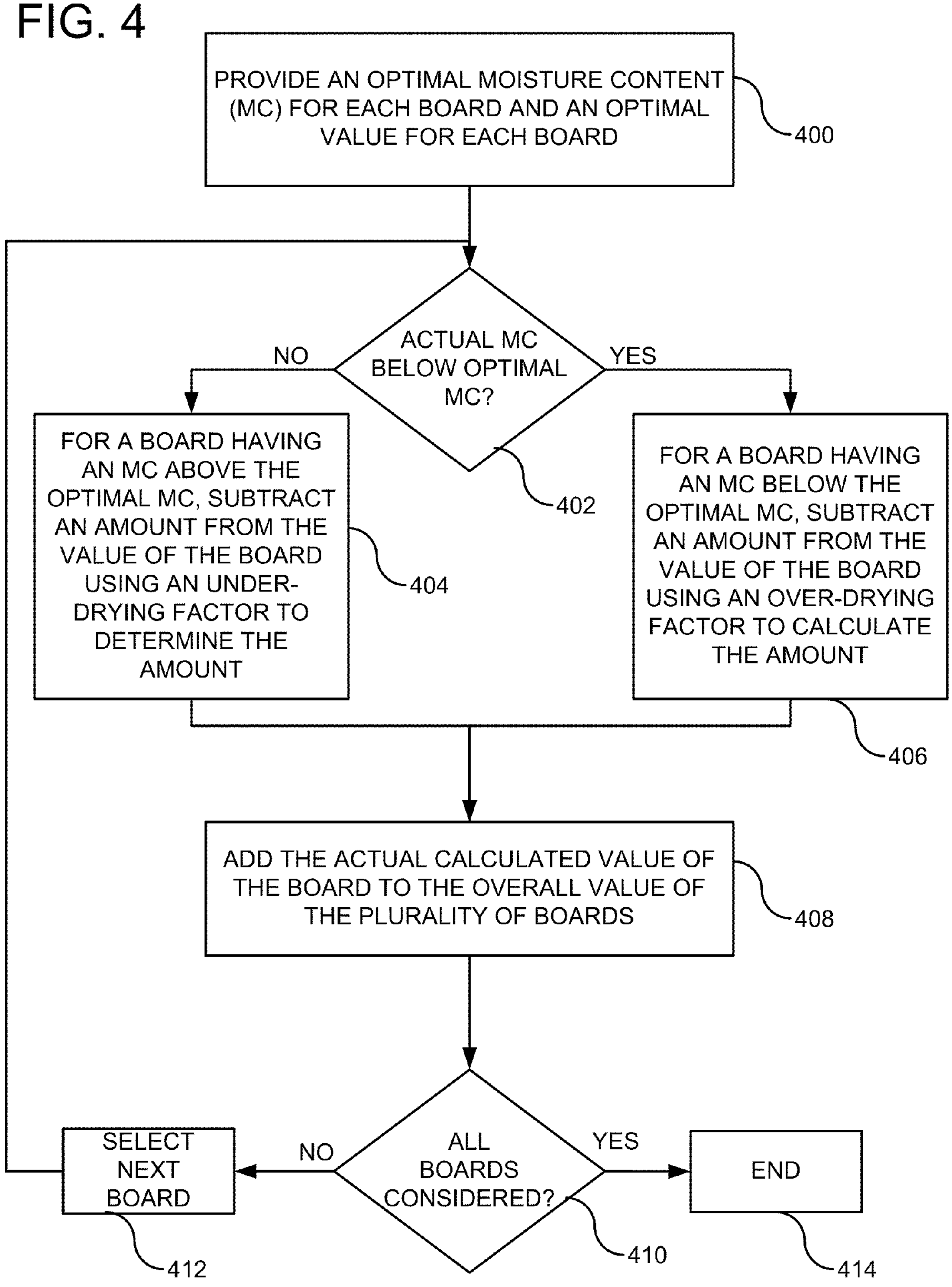
FIG. 4 is a flowchart for determining actual value of lumber.

FIG. 4 is a flowchart of a method for determining the actual price value for lumber and represents one embodiment that can be used to implement process block 202 in FIG. 2. In process block 400, an optimal moisture content for each board and an optimal value for each board are provided. These values depend on current market rate of lumber and what is considered an ideal moisture content for a particular application. Such values can be input through a user interface on computer 106, as is well-known in the art. In decision block 402, after board data is read from the database 110, a check is made for each board to determine if the actual moisture content is below the optimal moisture content. If it is not below (i.e., it is above) the optimal moisture content, then a formula is used in process block 404 to subtract an amount from the value of the board using an under-drying factor in order to determine a price value for the board. For example, the formula can be based on a linear relationship where the larger the discrepancy between the actual moisture content and the optimal moisture content causes a greater value to be subtracted from the value of the lumber. Alternative formulas can be used, such as non-linear relationships. If the actual moisture content is below the optimal moisture content, then in process block 406, an amount is subtracted from the value of the board based on an over-drying factor. The over-drying factor can differ from the under-drying factor. Indeed, generally, over-drying can have a greater impact on the value of lumber than under-drying. Like the formula for under-drying, the over-drying formula can be either linear or non-linear depending on the application. In process block 408, a value for the board is added to an overall value for the plurality of boards (normally a charge of lumber). In decision block 410, a check is made to determine if all the boards in the charge have been considered. If not, then in process block 412, a next board is selected and the process returns to decision block 402. If all the boards have been considered, then the process ends at process block 414.

Figure 5:
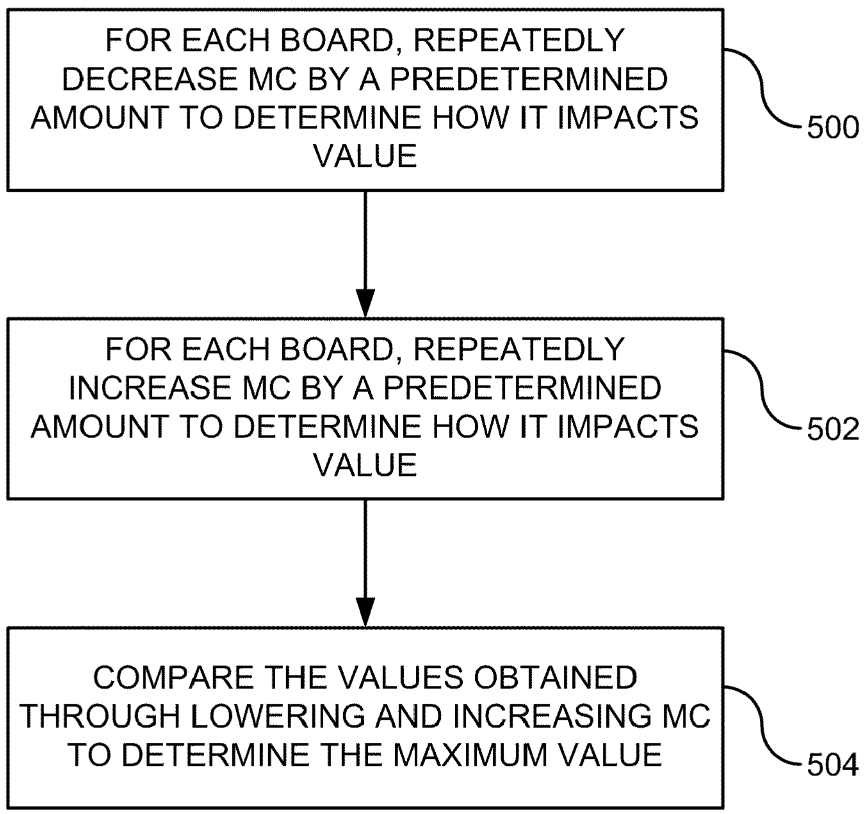
FIG. 5 is a flowchart providing further details for calculating how much the kiln operator needs to dry more or less to obtain the maximum value for a charge of lumber.

FIG. 5 is a flowchart of a method for calculating how to obtain the maximum value of the plurality of boards and represents one embodiment that can be used to implement process block 204 in FIG. 2. In process block 500, from a starting point, a hypothetical or candidate moisture content is repeatedly decreased by a predetermined amount in order to determine how it impacts the value of the overall charge of lumber. Of all the decreases, the one that results in the maximum value the lumber is saved. In process block 502, from the same starting point as process block 500, the hypothetical moisture content is increased a predetermined amount in order to determine how it impacts the value of the overall charge of lumber. Of all the increases, a second maximum value of the charge of lumber is saved. Then in process block 504, the first and second maximum values are compared to determine which hypothetical moisture content maximizes the value of lumber.

In an exemplary embodiment, an algorithm can be employed by which the shape of the population distribution is maintained and the mean value is shifted up and down to determine which optimum mean moisture content can be used to minimize the total value loss of lumber. The difference between this calculated value and the actual value is the amount in percentage moisture content that the entire charge was either under-dried or over-dried.

In an alternative embodiment, an algorithm can be employed where the translation of the distribution curve is calculated on a per-board basis. For example, a physical model of the drying rate of lumber can be used. Under that physical model, wetter boards dry at a faster rate than less wet boards. The physical model thus uses the fact that the drying rate is proportional to the moisture content less the equilibrium moisture content. This difference is used to determine how much to translate each board when decreasing and increasing the moisture content by a predetermined amount. It is recognized in the art that the equilibrium moisture content is a base moisture content which a board will dry to, based on the ambient conditions.

Still further, more complex models can be used, such as using a drying rate based on relative humidity. For example, a calculation of the difference between the relative humidity in equilibrium with the board and the relative humidity of the kiln provides a similar solution to using the difference of moisture content and the equilibrium moisture content.

Figure 6:
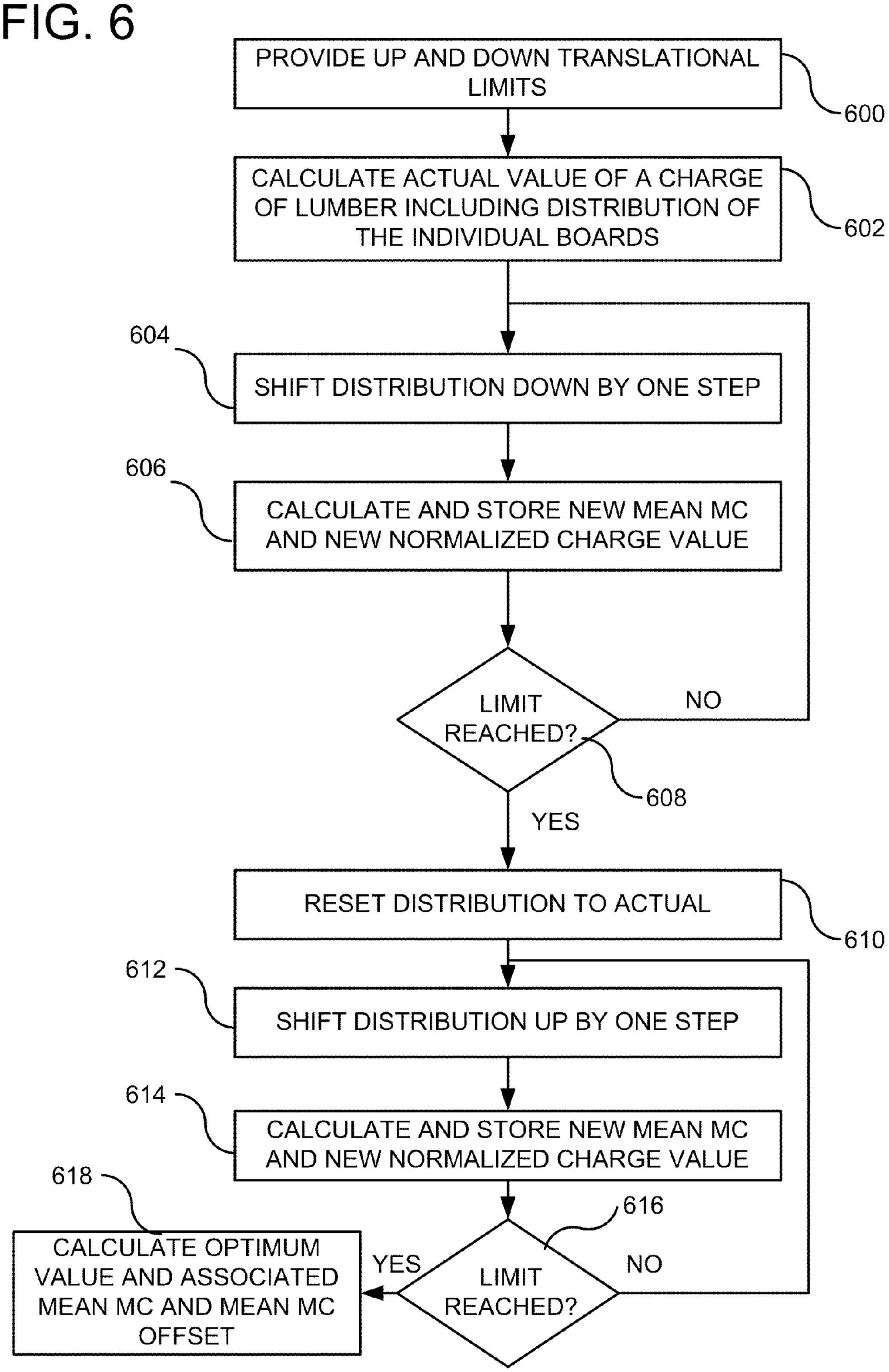
FIG. 6 is a detailed flowchart showing calculation of the maximum value of lumber.

FIG. 6 is a detailed flowchart of an exemplary embodiment. In process block 600, up and down translational limits are provided. The upper and lower translational limits can be predetermined constant values (i.e., hard coded), such as plus and minus 10%, respectively, as this much over- and under-drying is normally not observed in practice. Alternatively, the translational limits can be supplied through user inputs. In process block 602, an actual value of a charge of lumber can be calculated and a population distribution curve of moisture content for each board can be represented in a histogram. In process block 604, the population distribution can be shifted down by a predetermined amount, such as by one step (e.g., by 1%). In process block 606, a new mean moisture content and normalized charge value can be calculated and stored. In decision block 608, a check can be made to determine if a lower translational limit is reached. If not, then process blocks 604 and 606 can be performed again. Once the limit in decision block 608 is reached, the method continues with process block 610 where the population distribution is reset to a starting point which is the actual value that was originally measured in process block 602. In process block 612, the population distribution can be shifted up by a predetermined amount, such as by one step (e.g., by 1%). In process block 614, a new mean moisture content and new normalized charge value can be calculated. In decision block 616, a check is made whether an upper translational limit is reached. If not, then process blocks 612 and 614 can be performed again. Once the limit in decision block 616 is reached, the optimum price value can be calculated using the highest price value determined (process block 618). Additionally, a mean moisture content offset and mean moisture content can also be calculated.

In order to calculate value, input parameters can be obtained from a user (such as from mill management). Using such parameters, a value degrade penalty percentage is set for boards that are deemed to be too wet. For example, a mill can choose to have 0.5% value of the complete charge deducted for every 1% of boards that exceed a defined moisture content that would indicate a "wet" board, such as 22% moisture content (MC) value. Thus, if 8% of the total boards exceed 22% MC, then the total value of the load is reduced by 4.0%. This is one basis for devaluing lumber that is under-dried, although other costs may be associated, such as re-drying costs to bring the boards back up to full value in the normal dry range. Other parameters can be used and other devaluing strategies can also be employed. For over-drying, a formula can be used, such as for a board between 12% MC and 14% MC, a deduction of 1% of the value of the board can be used for each 1% of moisture content below 15%. The penalty rises to 1.5% value per % MC from 9% to 11%. Thus, under such a formula, a board at 12% MC would be devalued by 3% of its no penalty value (where the moisture content was between 15% and 22% MC). Thus, either linear or non-linear devaluation strategies can be employed.

Using these parameters and penalty strategies, a total value loss can be calculated for an entire charge of lumber. It is difficult to dry every single board to between 16% and 22% MC, which means that under normal circumstances a charge of lumber will be devalued from the theoretical 100% value. In the above described embodiment, an algorithm is employed by which the shape of the population distribution is maintained and the mean value shifted up and down to determine the optimum mean MC % that minimizes the total value loss of lumber. Specifically, a calculation of the total value of charge can be based on the shifted (hypothetical) amount. With this method, the percentage MC mean value that would have maximized the value of the complete charge of lumber can be calculated. The difference between this calculated value and the actual value is the amount in % MC that the entire charge was either under-dried or over-dried, depending on whether the calculated value is greater (over-dried) or less (under-dried) than the actual value.

Using a simple first order feedback system, one exemplary embodiment of this methodology can be to employ a feedback error value to adjust the in-kiln setpoint mean MC % value, so that if the charge was over-dried by 2% mean MC, the in-kiln setpoint should be offset by raising the setpoint shutdown value the 2% over-dry value. This is advantageous over the prior art, which assumes a setpoint is correct and then adjusts the in-kiln value to try to target the original setpoint value.

Figure 7:
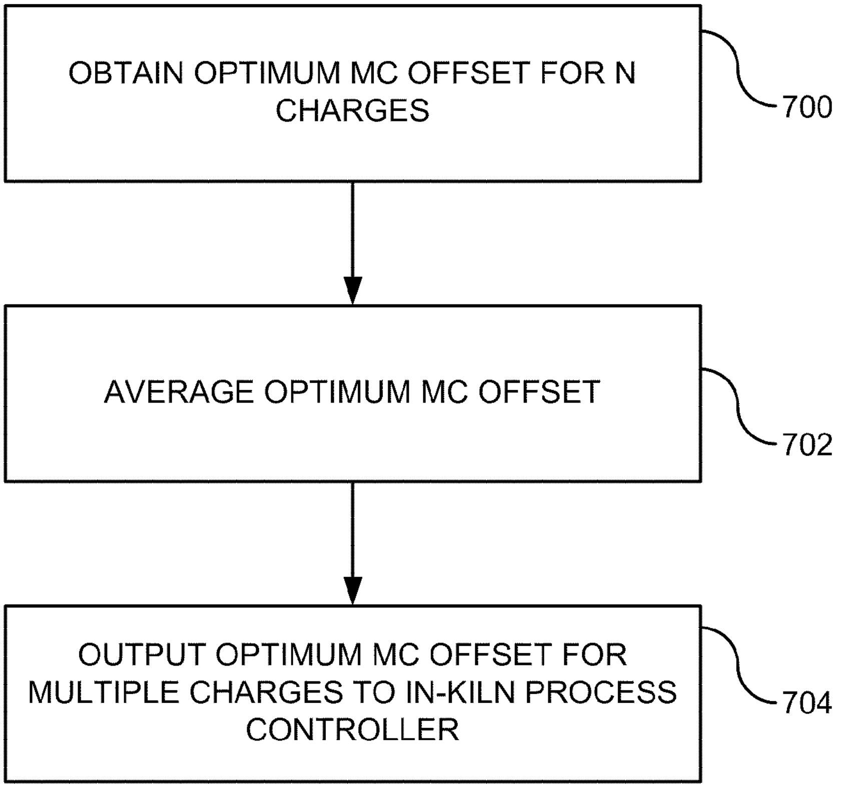
FIG. 7 is a flowchart for averaging moisture content over multiple charges used to determine a moisture content offset.

FIG. 7 shows an additional feature that can be used with the above-described methods, wherein the method extends beyond the first order feedback optimization system. There can be other varying factors influencing the moisture content distribution of the lumber charges that are being measured at the planer. For instance, there can be variability in pre-kiln and post kiln moisture content distribution. One example is that the lumber can be temporarily stored in a yard area (exposed to rain) before being placed in a kiln for drying. Additionally, the temporary storage time varies from charge to charge. There are also variances in the timber that is used from different geographic regions and from season to season. Additionally, the packages of lumber can be stored in yard areas after the kiln drying process for varying amounts of time.

One technique to reduce the before-mentioned variability is to take an average of the % MC over-drying/under-drying over a range of charges consisting of some number of weeks of data. By determining the average amount of under/over-dry, the variability in yard storage time, seasonal drifting, and other pertinent variability can be averaged out. This average under/over-dry amount in % MC can be used to perform an error adjustment to the in-kiln system (or handheld meter readings) shutdown point that maximizes the value of lumber over any considerable number of charges. While any one individual charge can still be under-dried or over-dried based on the value optimization sub process, over any substantial length of time that encompasses multiple charges, the total combined value loss can be minimized, thus maximizing kiln drying processes in the total value chain of the lumber production.

In process block 700, an optimum moisture content offset is obtained using techniques described above for N charges, where N is any desired number (e.g., 1, 2, 3, . . . 100). In process block 702, the optimum moisture content offset is averaged for all charges. In process block 704, the optimum moisture content offset for the N charges is output to an in-kiln process controller so that the kiln controller can modify the process in accordance with the results achieved. For example, it may be determined that the kiln is over-drying by 1%. In such a case, the kiln controller can modify its current process by targeting a moisture content that is 1% higher than its current value.

Figure 8:
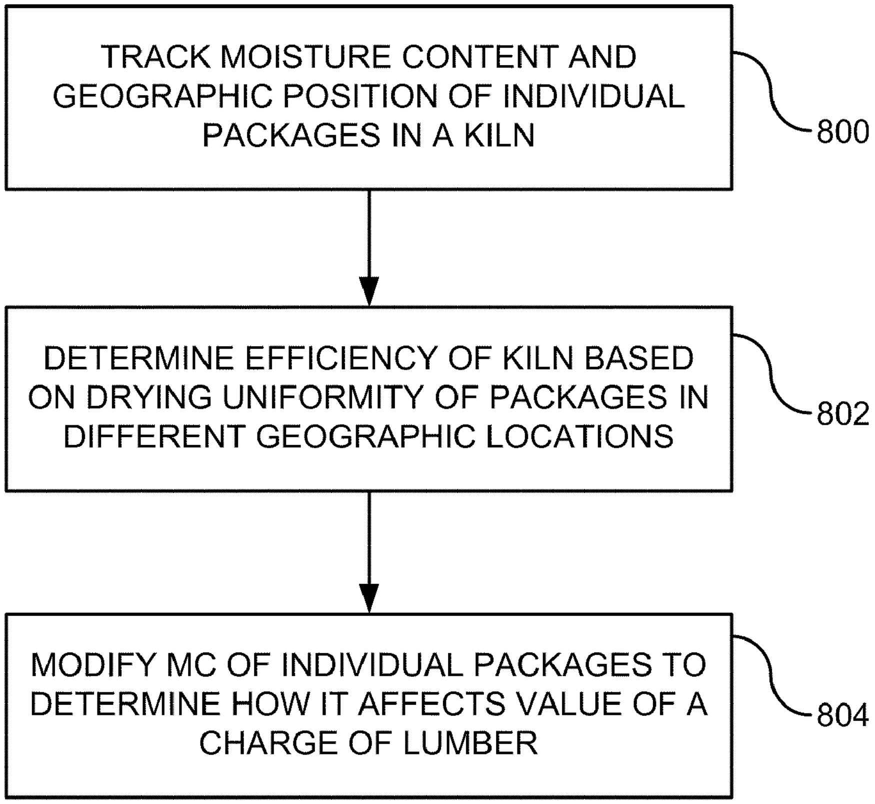
FIG. 8 is a flowchart of a method for determining kiln efficiency by tracking geographic position of individual packages.

FIG. 8 is a flowchart of a method for optimizing a kiln efficiency realization. In process block 800, moisture content and geographic position are tracked for individual packages in a kiln. The geographic position can be tracked using an identifier, such as a bar code. In process block 802, an efficiency of the kiln is determined based on drying uniformity of packages in the different geographic positions. In process block 804, a hypothetical moisture content for individual packages is modified based on the efficiency determination in order to optimize price value of the packages.

Thus, a kiln efficiency realization value for the current kiln drying process can be determined that characterizes how efficient the kiln is in terms of the uniformity of the drying process in relation to an optimum value. The efficiency value is defined to be 1 (100%) minus the difference of the optimum average value of lumber (i.e., the value once the moisture content is adjusted to a value needed to optimize the price value of lumber and assuming that the kiln is drying perfectly uniformly) minus the actual optimum average value (i.e., the value once the moisture content is adjusted to a value needed to optimize the price value of lumber, but using the actual drying uniformity of the kiln, which is not ideal). So, for instance, if the charges of lumber are being optimally dried, the average value may be 0.95 (or 95%) of the premium market price; however, if the kiln were to dry perfectly uniformly, then the calculated average value might be 0.98 (98%) of market value, and in this case, the efficiency value would calculate to 0.97, since 3% of value is being lost due to the non-uniformity of the kiln drying. The optimum value of uniformity may not be 100% achievable, but should nonetheless be approachable. These efficiency values can also be used to compare kiln-to-kiln uniformity in similar drying processes using identical make and model of kilns. Using this efficiency value, the potential value loss can be calculated for a charge of lumber by the equation: ValueLoss($)=OptimumValue($)*(1−efficiency).

Figure 9:
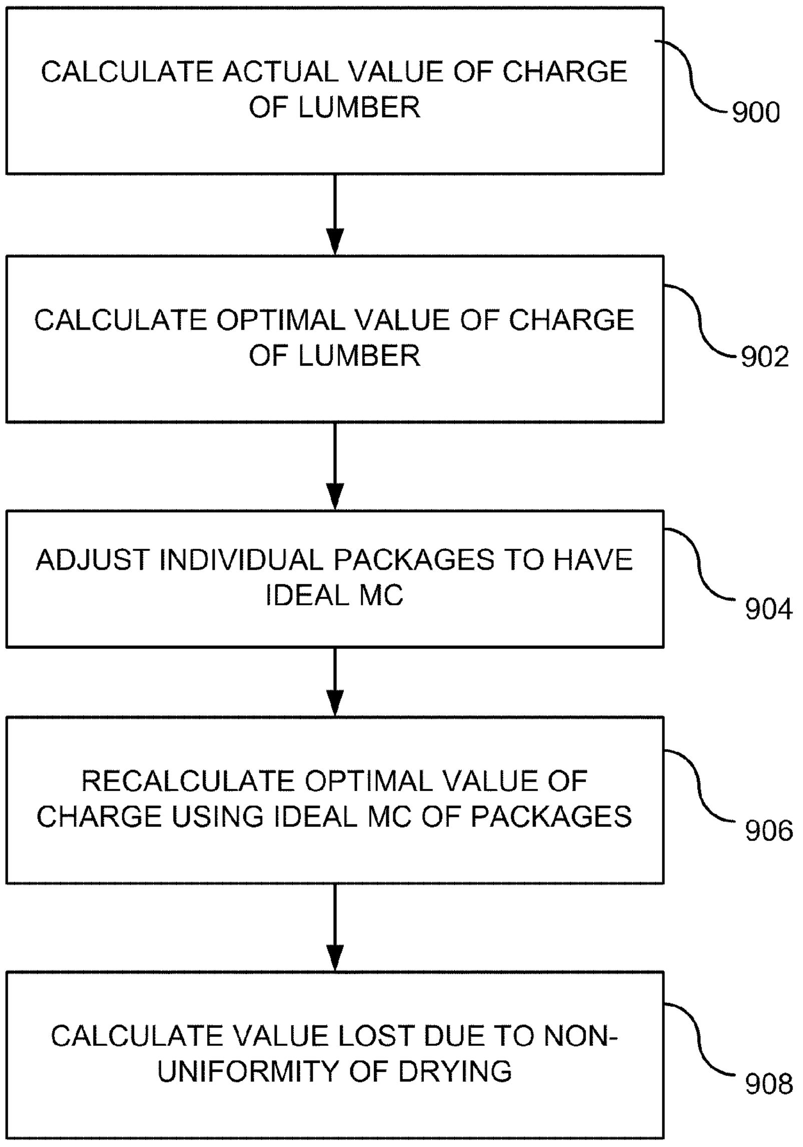
FIG. 9 is a detailed flowchart for determining kiln efficiency.

FIG. 9 is a flowchart illustrating additional process blocks that can be performed in order to optimize kiln efficiency. In process block 900, an actual value of a charge of lumber can be calculated. Such an actual valued can be determined using any of the methods as described in relation to FIGS. 2-7. In process block 902, an optimal value of the charge of lumber is calculated using any of the methods of FIGS. 2-7. In process block 904, individual packages are adjusted in order to have an optimum moisture content, which is one that maximizes price. In process block 906, after the individual packages are adjusted, the optimal value (i.e., maximum price value) of the charge is recalculated. Finally, in process block 908, the value lost due to non-uniformity of drying is calculated.

A specific example of the efficiency determination process averaged over multiple charges can be performed in the following manner. The first step is to take a certain number of charges, for example data for 6 charges, and segment the data into separate geographical regions within the kiln. Individual packages are tagged or bar-coded. A defined positional charge configuration is defined that assigns a location attribute to each package within the kiln. This positional attribute can be based on a three dimensional coordinate systems where the ordinates are Z (depth into kiln), X (left to right position within the kiln), and Y (bottom to top within the kiln). Packages in like locations can be combined for a number of charges to provide a mechanism whereby the noise (e.g., the short term variability, such as differences in package distribution, yard storage time, etc.) introduced from charge to charge can be nullified or averaged out. Ideally, the differences can be averaged from the package means to the overall charge mean for each charge. Then these differences are averaged for each location over all the charges.

The combined data is used to perform the optimization valuation and actual valuation based on the methodology described above. These values can be used to determine the amount of value loss due to the improper amount of drying based on the average charge mean moisture content. The "Mean Efficiency Realization" can be calculated by subtracting the actual average charge value (i.e., the average over multiple charges) from the optimum average charge value based on either over-drying or under-drying.

An added measure of potential value that is lost due to the non-uniformity of the kiln drying process can now be calculated. The "Mean Efficiency Realization" metric determines the value loss due to not hitting the optimum mean moisture content for a charge of lumber. A second efficiency metric ("Kiln Efficiency Realization") can be used to determine the value loss due to the variability in mean moisture content within kiln due to the non-uniformity of the drying within the kiln. It is preferable to distinguish here that the first efficiency metric ("Mean Efficiency Realization") is a function of the inputs to the kiln in terms of the lumber input distributions and the operator controller processes, and the second efficiency metric ("Kiln Efficiency Realization") is an inherent function of the kiln itself and its hardware controller related processes.

Next, the distribution of every package can be translated to the determined optimum mean moisture content. This assumes that every package is dried down to the same mean moisture content as the optimum value, so that there is no variability in mean moisture content from package to package, or within kiln. Using the total distribution, the value of the entire dataset is calculated based on the constraint strategies and algorithms used in the "Mean Efficiency Realization" methodology. This value improvement, calculated by subtracting the optimized % value determination from this new value shows the value loss due to the non-uniformity of the kiln based on the optimized mean moisture content value with variability considered and accounted for. There is still an added value loss that can be calculated, and that is the value loss due to the affect of the variability (or within kiln non-uniformity) on the optimum mean moisture content determination. Finally, another optimization mean moisture content determination is performed on the translated uniform mean moisture content combined data to determine the loss due to the offset in optimum mean moisture content setpoint. The total combined value loss is then the added components of the two separate loss components. The concept is that since the kiln is drying non-uniformly, the optimized mean moisture content determination can be affected, and that in turn will affect the potential value of a charge of lumber.

Exemplary embodiments include qualifying a kiln's performance, kiln to kiln uniformity, kiln performance monitoring and trending, optimizing kiln to species mating for drying control programs, cost justification for kiln maintenance and or retrofitting.

Figure 10:
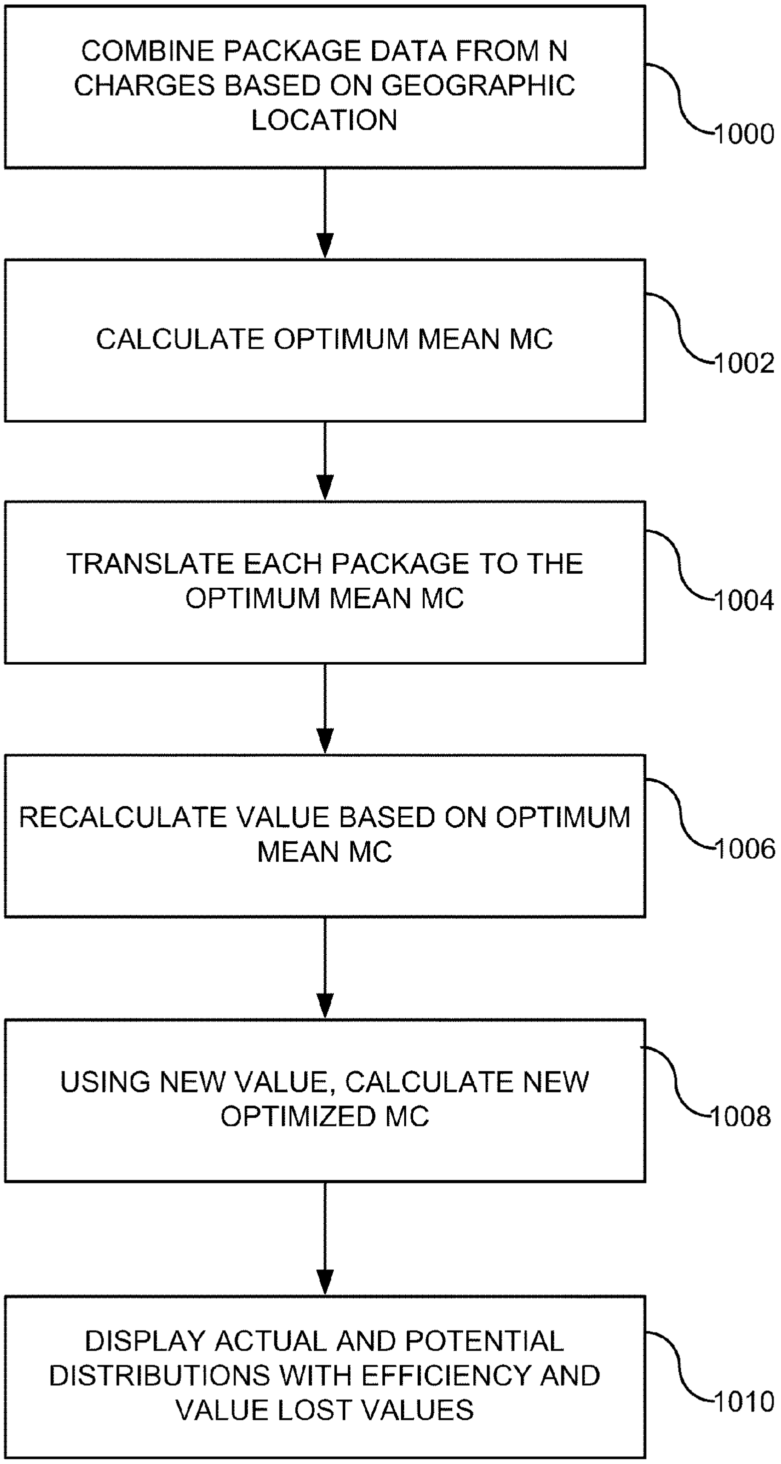
FIG. 10 is a flowchart for determining kiln efficiency using multiple charges.

FIG. 10 provides a detailed flowchart of the methodology discussed above. In process block 1000, the package data from N charges is combined based on geographic location. Averaging over multiple charges reduces variability in different parameters that affect the moisture content of lumber. In process block 1002, the optimum mean moisture content is calculated in order to produce a maximum price value. In process block 1004, each package is individually translated to the optimum mean moisture content. In process block 1006, the overall price value is recalculated based on the optimum mean moisture content with individual packages adjusted. In process block 1008, using the new overall price value, a new moisture content is calculated. Finally, in process block 1010, the actual and potential distributions with efficiency and lost values are displayed.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of optimizing a value of lumber, comprising:

measuring moisture content for a plurality of boards;

based on the measured moisture content, determining an actual price value of the plurality of boards; and automatically calculating, by a computer, how to obtain a maximum price value of the plurality of boards based on modification of the moisture content, wherein automatically calculating includes determining multiple hypothetical moisture contents, different than the measured moisture content, determining multiple hypothetical price values for the multiple hypothetical moisture contents, and comparing the multiple hypothetical price values to determine an average moisture content value offset needed for obtaining the maximum price value for the plurality of boards.

2. The method of claim 1, wherein the measuring of moisture content is accomplished using a moisture reader.

3. The method of claim 1, wherein measuring includes passing each board through a moisture reader and storing a resultant moisture content value for each board in a database.

4. The method of claim 1, wherein determining the actual price value of the plurality of boards includes:

a) providing an optimal moisture content and estimated value for each board;

b) comparing the measured moisture content to the optimal moisture content;

c) for a board having a moisture content below the optimal moisture content, subtracting a first amount from the estimated value using an over-drying factor to determine the actual price value of the board; and d) for a board having a moisture content above the optimal moisture content, subtracting a second amount, different than the first amount, from the estimated value using an under-drying factor to determine the actual price value of the board.

5. The method of claim 4, further including adding the actual price values of each board to obtain a total value for a plurality of boards.

6. The method of claim 1, wherein automatically calculating includes repeatedly decreasing a hypothetical moisture content a predetermined amount from a starting point for each board to determine how such decreasing impacts an estimated value of each board and repeatedly increasing a hypothetical moisture content a predetermined amount from the starting point for each board to determine how such increasing impacts an estimated value of each board.

7. The method of claim 6, further including generating a population distribution curve for the plurality of boards and wherein repeatedly decreasing and repeatedly increasing includes shifting the population distribution curve both down and up while maintaining the general shape of the distribution.

8. The method of claim 6, further including the following:

generating a population distribution curve for the plurality of boards;

calculating a drying rate as being proportional to the difference between the measured moisture content and an equilibrium moisture content; and wherein repeatedly decreasing and repeatedly increasing includes shifting each board individually up or down from the population distribution using a physical model of the drying rate.

9. The method of claim 1, further including:

averaging the maximum price value over multiple charges of lumber;

averaging the actual price value over the multiple charges of lumber; and subtracting the average actual price value from the average maximum price value to determine a loss in value of the lumber.

10. The method of claim 1, further including:

averaging the mean moisture content over multiple charges of lumber to determine the overall mean moisture content and outputting the overall mean moisture content to a kiln controller.

11. The method of claim 1, further including calculating N optimum moisture content offsets for N charges;

averaging the N optimum moisture content offsets; and outputting the average to a kiln controller.

12. An apparatus for optimizing a value of lumber, comprising:

a content sensor for reading a value of moisture content in a plurality of boards;

a control console coupled to the content sensor for controlling the content sensor; and a computer coupled to the control console, the computer having software executing thereon that calculates an actual price value of the plurality of boards and a maximized price value if the moisture content is modified, wherein calculating a maximized price value includes determining multiple hypothetical moisture contents, determining multiple hypothetical price values for the multiple hypothetical moisture contents, and comparing the multiple hypothetical price values for obtaining the maximized price value.

13. A computer-readable storage device having instructions stored thereon for executing on a computer a method of optimizing a value of lumber, the method comprising:

measuring moisture content for a plurality of boards;

based on the measured moisture content, determining an actual price value of the plurality of boards; and automatically calculating, using the computer, how to obtain a maximum price value of the plurality of boards based on modification of the moisture content, wherein automatically calculating includes determining multiple hypothetical moisture contents, determining multiple hypothetical price values for the multiple hypothetical moisture contents, and comparing the multiple hypothetical price values to determine an average moisture content value needed for obtaining the maximum price value for the plurality of boards.

14. The computer-readable storage device of claim 13, wherein determining the actual price value of the plurality of boards includes:

a) providing an optimal moisture content and estimated value for each board;

b) comparing the measured moisture content to the optimal moisture content;

c) for a board having a moisture content below the optimal moisture content, subtracting a first amount from the estimated value using an over-drying factor to determine the actual price value of the board; and d) for a board having a moisture content above the optimal moisture content, subtracting a second amount, different than the first amount, from the estimated value using an under-drying factor to determine the actual price value of the board.

15. The computer-readable storage device of claim 13, further including adding the actual price values of each board to obtain a total value for a plurality of boards.

16. The computer-readable storage device of claim 13, wherein automatically calculating includes repeatedly decreasing a hypothetical moisture content a predetermined amount from a starting point for each board to determine how such decreasing impacts an estimated value of each board and repeatedly increasing a hypothetical moisture content a predetermined amount from the starting point for each board to determine how such increasing impacts an estimated value of each board.

17. The computer-readable storage device of claim 16, further including the following:

generating a population distribution curve for the plurality of boards;

calculating a drying rate as being proportional to the difference between the measured moisture content and an equilibrium moisture content; and wherein repeatedly decreasing and repeatedly increasing includes shifting each board individually up or down from the population distribution using a physical model of the drying rate.

18. The computer-readable storage device of claim 13, further including:

averaging the maximum price value over multiple charges of lumber;

averaging the actual price value over the multiple charges of lumber; and subtracting the average actual price value from the average maximum price value to determine a loss in value of the lumber.

19. The computer-readable storage device of claim 13, further including:

averaging the mean moisture content over multiple charges of lumber to determine the overall mean moisture content and outputting the overall mean moisture content to a kiln controller.

20. The computer-readable storage device of claim 13, further including receiving user input including a value of lumber based on moisture content according to market rates, and wherein determining the actual price value includes using the value input by the user.

* * * * *